(12) United States Patent
Ishida

(10) Patent No.: US 7,108,009 B2
(45) Date of Patent: Sep. 19, 2006

(54) SEMICONDUCTOR MANUFACTURING APPARATUS ENABLING INSPECTION OF MASS FLOW CONTROLLER MAINTAINING CONNECTION THERETO

(75) Inventor: Shoji Ishida, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 219 days.

(21) Appl. No.: 10/682,076

(22) Filed: Oct. 10, 2003

(65) Prior Publication Data

US 2004/0094206 A1    May 20, 2004

(30) Foreign Application Priority Data

Nov. 15, 2002  (JP) ............... 2002-331840
Apr. 28, 2003  (JP) ............... 2003-123498

(51) Int. Cl.
*G01F 25/00*  (2006.01)
*G05D 7/06*  (2006.01)

(52) U.S. Cl. .................. 137/487.5; 137/613; 73/1.35; 702/100

(58) Field of Classification Search .......... 137/487.5, 137/613; 73/1.35, 168; 702/100, 114; 118/715; 438/935

See application file for complete search history.

(56) References Cited

U.S. PATENT DOCUMENTS 5,233,861 A * 8/1993 Gore et al. ................ 73/1.16
5,394,755 A * 3/1995 Sudo et al. ................ 73/861
5,744,695 A * 4/1998 Forbes ...................... 73/1.35
5,810,928 A * 9/1998 Harada et al. ............. 118/690

FOREIGN PATENT DOCUMENTS

| JP | 63164432 A | * | 7/1988 |
| JP | 5-108167 A |   | 4/1993 |
| JP | 6-41759 A  |   | 2/1994 |
| JP | 6-53103 A  |   | 2/1994 |
| JP | 6-119059 A |   | 4/1994 |
| JP | 7-134052 A |   | 5/1995 |
| JP | 08153685 A | * | 6/1996 |
| JP | 08241131 A | * | 9/1996 |
| JP | 11-223538 A |  | 8/1999 |
| JP | 11223538 A | * | 8/1999 |

* cited by examiner

*Primary Examiner*—Ramesh Krishnamurthy
(74) *Attorney, Agent, or Firm*—McDermott Will & Emery LLP (57) ABSTRACT

An opening/closing of a plurality of valves are controlled so that a plurality of gases flow into a chamber in an operation of a semiconductor manufacturing apparatus, and the opening/closing of the plurality of valves are controlled so that a gas A flows into mass flowmeters in an inspection of a mass flow controller MFC 2'. Therefore, the inspection can be achieved while maintaining the connection of mass flow controller MFC 2' to the semiconductor manufacturing apparatus.

8 Claims, 14 Drawing Sheets

```
┌─────────────────────────────────────────────┐
│          INSPECTION ITEM SETTING FRAME      │
│                                             │
│       SET THE INSPECTION ITEM               │
│                                             │
│         [◎]   FLOW RATE ACCURACY INSPECTION │
│                                             │
│   INSPECTION RANGE   [0]  ~  [100] %        │
│                                             │
│   INSPECTION INCREMENT   [10] %             │
│                                             │
│                                             │
│         [◎]   REPEATABILITY INSPECTION      │
│                                             │
│   NUMBER OF REPETITION   [5]  TIMES         │
│                                             │
│                                             │
│         [◎]   LINEARITY INSPECTION          │
│                                             │
│                                             │
│   INSPECTION TURNAROUND TIME [1] HOUR [15] MINUTES │
│                                             │
│              START INSPECTION               │
└─────────────────────────────────────────────┘
```

FIG.8

INSPECTION RESULT INDICATION FRAME

1. FLOW RATE ACCURACY INSPECTION RESULT

| SET VALUE | MEASURED VALUE | DETERMINATION CRITERION | ERROR | DETERMINATION |
|---|---|---|---|---|
| 0% | 0.2% | ±3% OR SMALLER | 0.2% | ACCEPTABLE |
| 10% | 10.1% | | 1.0% | ACCEPTABLE |
| 20% | 20.1% | | 0.5% | ACCEPTABLE |
| 30% | 30.4% | | 1.3% | ACCEPTABLE |
| 40% | 39.9% | | -0.3% | ACCEPTABLE |
| 50% | 50.7% | | 1.4% | ACCEPTABLE |
| 60% | 59.9% | | -0.2% | ACCEPTABLE |
| 70% | 70.6% | | 0.9% | ACCEPTABLE |
| 80% | 80.3% | | 0.4% | ACCEPTABLE |
| 90% | 90.5% | | 0.6% | ACCEPTABLE |
| 100% | 99.8% | | -0.2% | ACCEPTABLE |

2. REPEATABILITY INSPECTION RESULT

| SET VALUE | AVERAGE OF MEASURED VALUES | DETERMINATION CRITERION | STANDARD DEVIATION | DETERMINATION |
|---|---|---|---|---|
| 0% | 0.2% | ±0.33% OR SMALLER | 0.03% | ACCEPTABLE |
| 10% | 10.1% | | 0.04% | ACCEPTABLE |
| 20% | 20.1% | | 0.06% | ACCEPTABLE |
| 30% | 30.4% | | 0.04% | ACCEPTABLE |
| 40% | 39.9% | | 0.02% | ACCEPTABLE |
| 50% | 50.7% | | 0.05% | ACCEPTABLE |
| 60% | 59.9% | | 0.10% | ACCEPTABLE |
| 70% | 70.6% | | 0.03% | ACCEPTABLE |
| 80% | 80.3% | | 0.04% | ACCEPTABLE |
| 90% | 90.5% | | 0.05% | ACCEPTABLE |
| 100% | 99.8% | | 0.06% | ACCEPTABLE |

3. LINEARITY INSPECTION RESULT

$Y = aX + b$
$= 0.9994X + 0.0003$

DETERMINATION CRITERION: $a > 0.99$, $b < 0.01$

| DETERMINATION | ACCEPTABLE |
|---|---|

INSPECTION RESULT — ACCEPTABLE (Graph: FLOW RATE vs. index 1–11, showing SET VALUE and AVERAGE OF MEASURED VALUES from 0% to 100%)

SEMICONDUCTOR MANUFACTURING APPARATUS ENABLING INSPECTION OF MASS FLOW CONTROLLER MAINTAINING CONNECTION THERETO

BACKGROUND OF THE INVENTION

1. Field of the Invention

The present invention relates to a semiconductor manufacturing apparatus such as an etcher or a CVD (Chemical Vapor Deposition) that controls the flow rate of gas for manufacturing semiconductor devices, and specifically, to a semiconductor manufacturing apparatus performing an automatic inspection and an automatic switching of flow rate controllers, flow rate indicators and the like.

2. Description of the Background Art

Recently, semiconductor devices are applied in apparatuses of every field with enormous consumption amount. Among manufacturing apparatuses for such semiconductor devices, apparatuses such as an etcher or a CVD utilizes various gases for processing. Generally, for a manufacturing apparatus that uses the gas for processing, a mass flow controller (MFC) controlling the flow rate of the gas, a mass flowmeter (MFM) for inspection that indicates the flow rate of the gas and the like are used.

Some techniques related to such a semiconductor manufacturing apparatus are inventions disclosed in Japanese Patent Laying-Open Nos. 6-53103 and 5-108167.

A semiconductor manufacturing apparatus disclosed in Japanese Patent Laying-Open No. 6-53103 includes one or more calibrating mass flow controller(s) for automatically calibrating the flow characteristics of a mass flow controller, and a piping system serially connecting the measuring mass flow controller and the calibrating mass flow controller(s), through which less reactive gas is passed.

In a control apparatus disclosed in Japanese Patent Laying-Open No. 5-108167, a sequence controller monitors the fluctuation in an operation of a mass flow controller for a predetermined period from the initiation of the operation, thereby detecting an anomaly in the mass flow controller.

As described above, the semiconductor manufacturing apparatus disclosed in Japanese Patent Laying-Open No. 6-53103 includes the piping system serially connecting the measuring mass flow controller and the calibrating mass flow controller(s), which enables calibration of the measuring mass flow controller to be inspected. On the other hand, since the flow rate of the gas is controlled by the calibrating mass flow controller(s) first, and then the gas is passed to the measuring mass flow controller to be inspected, only the flow rate sensor unit of the measuring mass flow controller can be inspected, while the flow rate control performance thereof is left unchecked.

Further, since the gas for inspection flows into the calibrating mass flow controller via an exclusive path, a complicated piping system will be required, which involves additional costs for parts and piping, making the semiconductor manufacturing apparatus undesirably expensive.

Still further, as described above, in the control apparatus disclosed in Japanese Patent Laying-Open No. 5-108167, the sequence controller detects an anomaly in the mass flow controller. On the other hand, when an anomaly is found, it is required to stop the operation of the semiconductor manufacturing apparatus, to remove the piping, to change the mass flow controller, and thereafter to perform tests such as a leakage test or a process test. Therefore, the semiconductor manufacturing apparatus must be stopped for extremely long period undesirably.

SUMMARY OF THE INVENTION

An object of the present invention is to provide a semiconductor manufacturing apparatus capable of performing an inspection of a mass flow controller connected thereto, while maintaining the connection therebetween.

A semiconductor manufacturing apparatus using a plurality of gases for processing according to the present invention includes: a chamber into which the plurality of gases flow; a plurality of mass flow controllers provided corresponding to the plurality of gases; a mass flowmeter measuring each flow rate of the plurality of gases; a plurality of valves controlling each flow of the plurality of gases; and a control unit controlling opening/closing of the plurality of valves such that the plurality of gases flow into the chamber directly during an operation of the semiconductor manufacturing apparatus, and controlling opening/closing of the plurality of valves such that any one of the plurality of gases flows into the mass flowmeter when inspecting the mass flow controller.

According to the semiconductor manufacturing apparatus of the present invention, since control unit controls the opening/closing of a plurality of valves so that any one of a plurality of gases flows into a mass flowmeter during the inspection of a mass flow controller, inspection of the mass flow controller is enabled while maintaining the connection.

According to another aspect of the present invention, a semiconductor manufacturing apparatus using a plurality of gases for processing includes: a chamber into which the plurality of gases flow; a plurality of mass flow controllers provided corresponding to the plurality of gases; a plurality of valves controlling each flow of the plurality of gases; and a control unit controlling opening/closing of the plurality of valves such that the plurality of gases flow into the chamber directly during an operation of the semiconductor manufacturing apparatus, and controlling opening/closing of the plurality of valves such that, when inspecting a first mass flow controller, a first gas flows into the first mass flow controller via a second mass flow controller.

Since the opening/closing of the plurality of valves is controlled by the control unit such that, when inspecting the first mass flow controller, the first gas flows into the first mass flow controller via the second mass flow controller, inspection of the first mass flow controller is enabled while maintaining the connection of the first and the second mass flow controllers.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
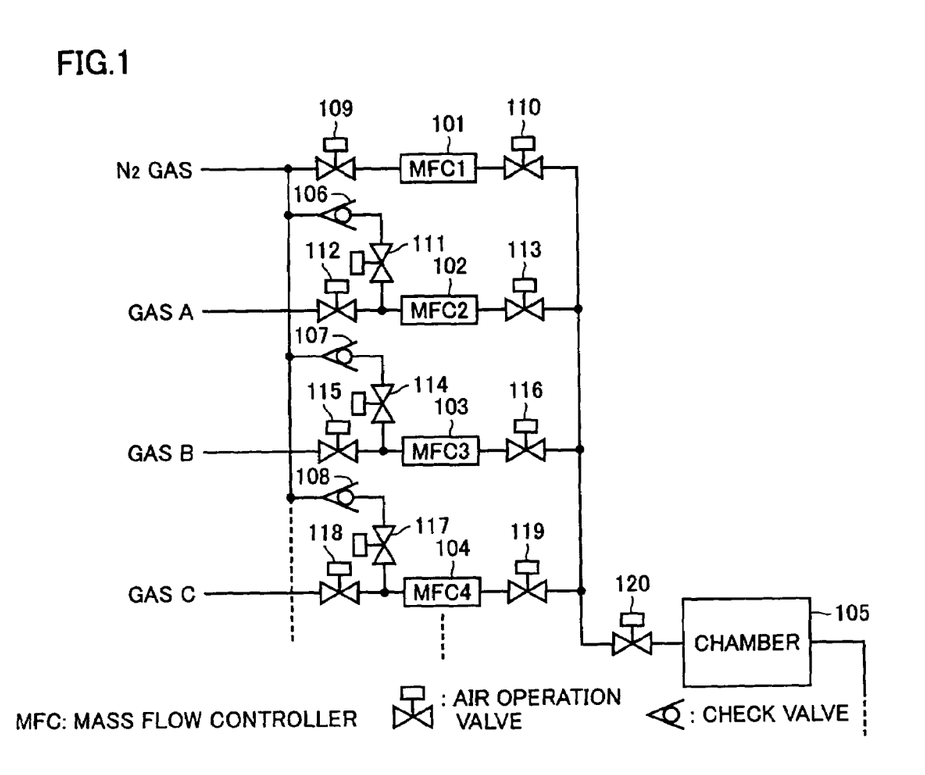
FIG. 1 is an illustration related to a description of a gas flow in a general semiconductor manufacturing apparatus such as an etcher or a CVD.

FIG. 1 is an illustration related to a description of a gas flow in a general semiconductor manufacturing apparatus such as an etcher or a CVD. The semiconductor manufacturing apparatus includes mass flow controllers (MFC) 1–4 (101–104), a chamber 105, check valves 106–108, and air operation valves (hereinafter simply referred to as valves) 109–120.

In this configuration, when an anomaly appears, for example in MFC 2 (102), it can not be inspected and thus must be removed after closing valves 111–113, and thereafter must be inspected independently.

Figure 2:
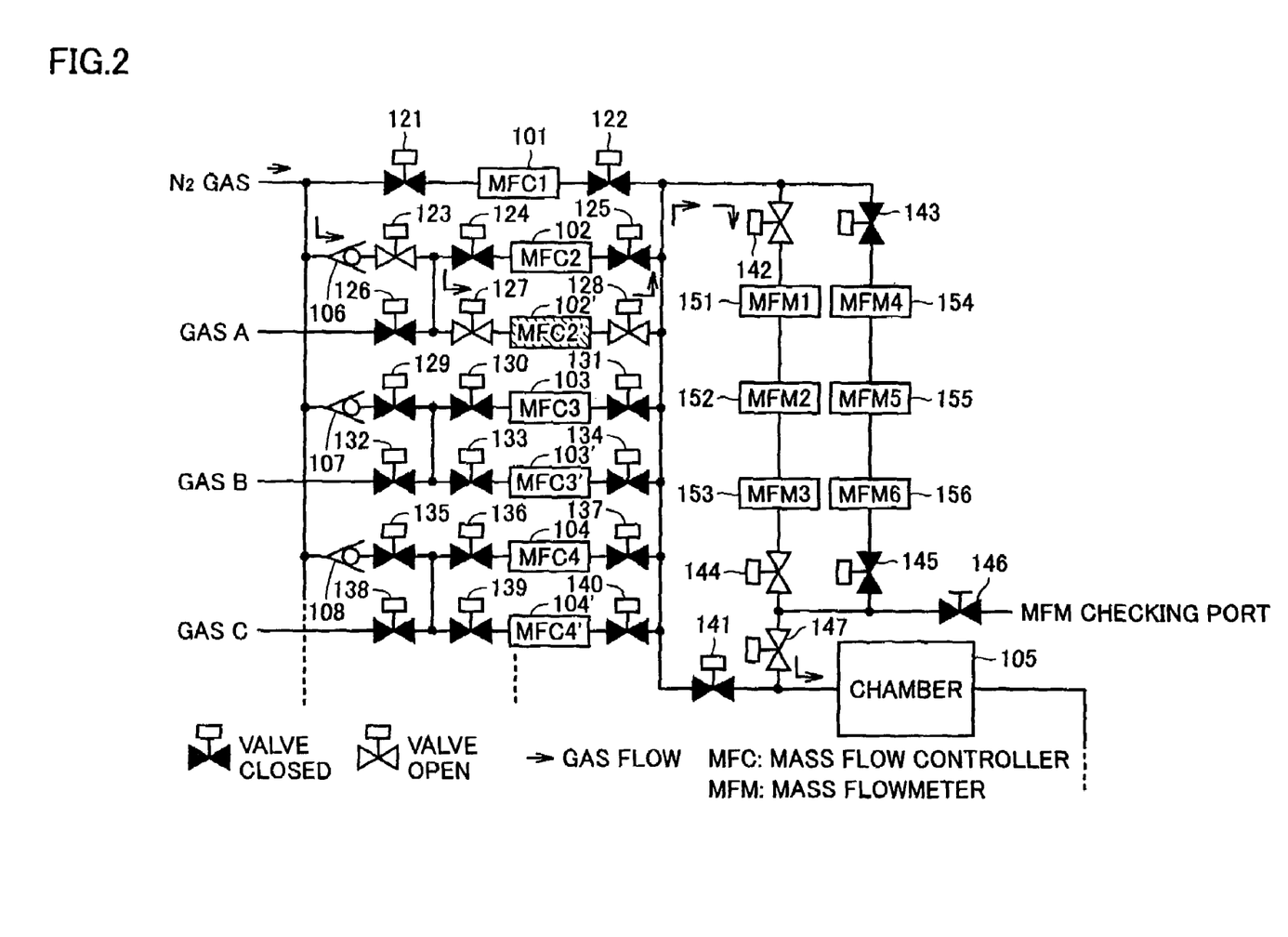
FIG. 2 is a block diagram schematically showing a configuration of a semiconductor manufacturing apparatus according to a first embodiment of the present invention.

FIG. 2 is a block diagram schematically showing a configuration of a semiconductor manufacturing apparatus according to a first embodiment of the present invention. A gas flow during an inspection of mass flow controller (MFC 2') is indicated. The semiconductor manufacturing apparatus includes MFC 1–4 (101–104), MFC 2'–4' (102'–104'), chamber 105, check valves 106–108, valves 121–147, and mass flowmeters (MFM) 1–6 (151–156). Each of the components can be controlled by a computer that will be described below.

MFC 2'–4' (102'–104') are the same type of mass flow controllers as MFC 2–4 (102–104), respectively, and switched when an anomaly appears in MFC 2–4 (102–104) to control the gas flow rate. For example, FIG. 2 indicates a state when the control is switched from MFC 2 (102) to MFC 2' (102'), where valves 124 and 125 are closed to stop the operation of MFC 2 (102), while valves 127 and 128 are open to initiate the operation of MFC 2' (102'). In such a state when MFC 2 (102) is determined to be involved with anomaly, the control is switched to MFC 2' (120') so that a gas A can flow into chamber 105 without stopping the operation of the semiconductor manufacturing apparatus.

MFM 1–6 (151–156) are mass flowmeters with different flow rate ranges, respectively. The flow rate accuracy of a flow rate indicator such as a mass flowmeter differs depending on the full scale of the flow rate. When a gas of a small flow rate is measured with a flow rate indicator for a large flow rate, the measurement error increases. Accordingly, when measuring a gas of a small flow rate, a mass flowmeter with the value suitable for that flow rate is employed. The flow rate range and the number of MFM can be determined as appropriate in accordance with the flow rate range of MFC.

FIG. 2 indicates the state when inspecting MFC 2' (102'), where valves 142, 144 and 147 are open and the gas flows into chamber 105 from MFC 2' (102') via MFM 1–MFM3 (151–153). At this time, valves 141, 143, 145, and 146 are closed. When inspecting other MFC, valves are controlled to be open/closed as appropriate.

Figure 3:
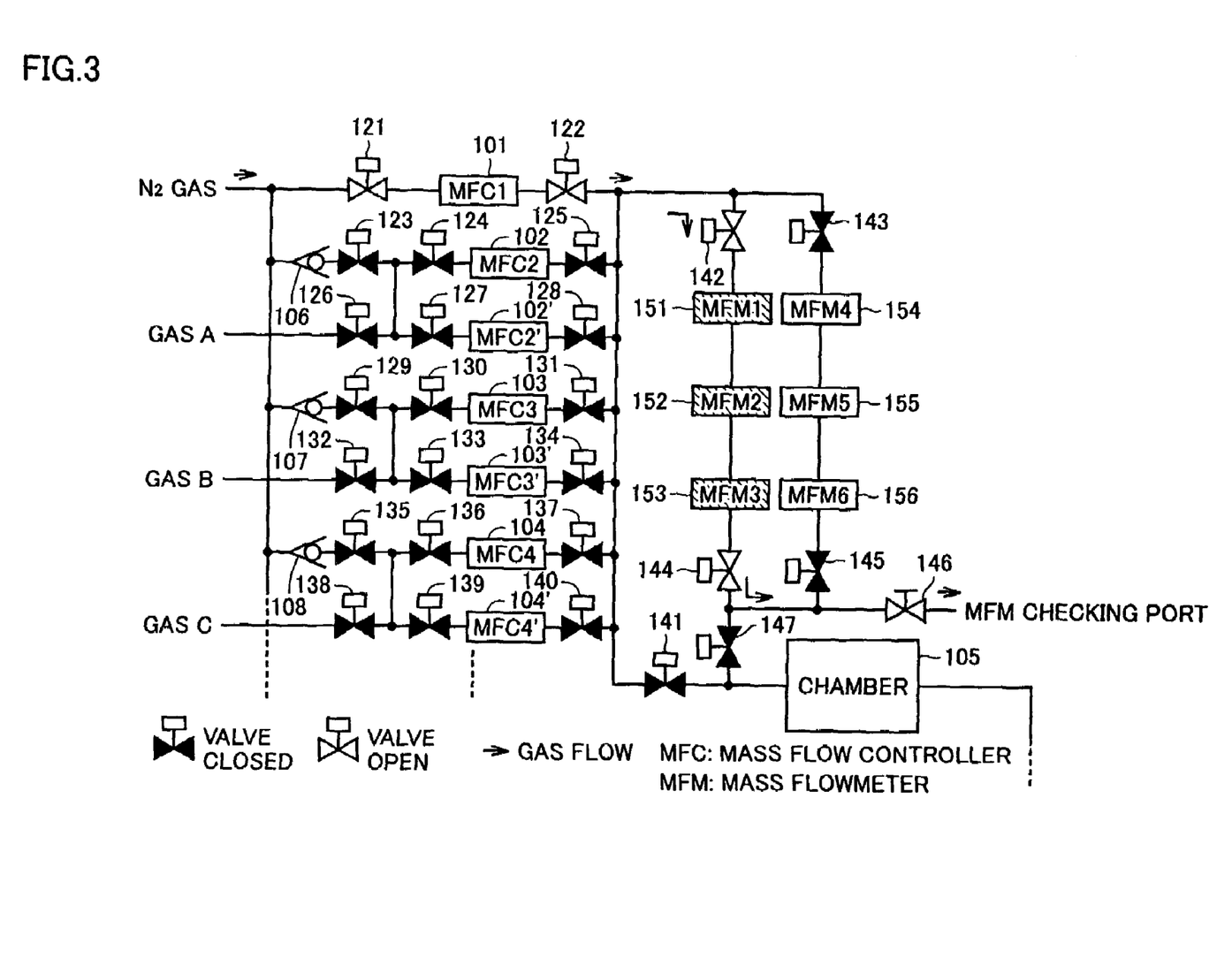
FIG. 3 is an illustration related to a description of a gas flow during the inspection of MFM 1–3 of the semiconductor manufacturing apparatus according to the first embodiment of the present invention.

FIG. 3 is an illustration related to a description of a gas flow during an inspection of mass flowmeters (MFM 1–3) of the semiconductor manufacturing apparatus according to the first embodiment of the present invention. To an MFM checking port, external inspection equipment such as a thin-film flowmeter for inspecting MFM 1–6 (151–156) is attached. Valves 121, 122, 142, 144 and 146 are open while the rest of the valves are closed, and $N_2$ (nitrogen) gas flows into the external inspecting equipment via MFM checking port. Thus, the accuracy of MFM 1–3 (151–153) can be checked without opening the chamber. When checking accuracy of MFM 4–6 (154–156), valves 121, 122, 143, 145 and 146 are open while the rests of the valves are closed.

Figure 4:
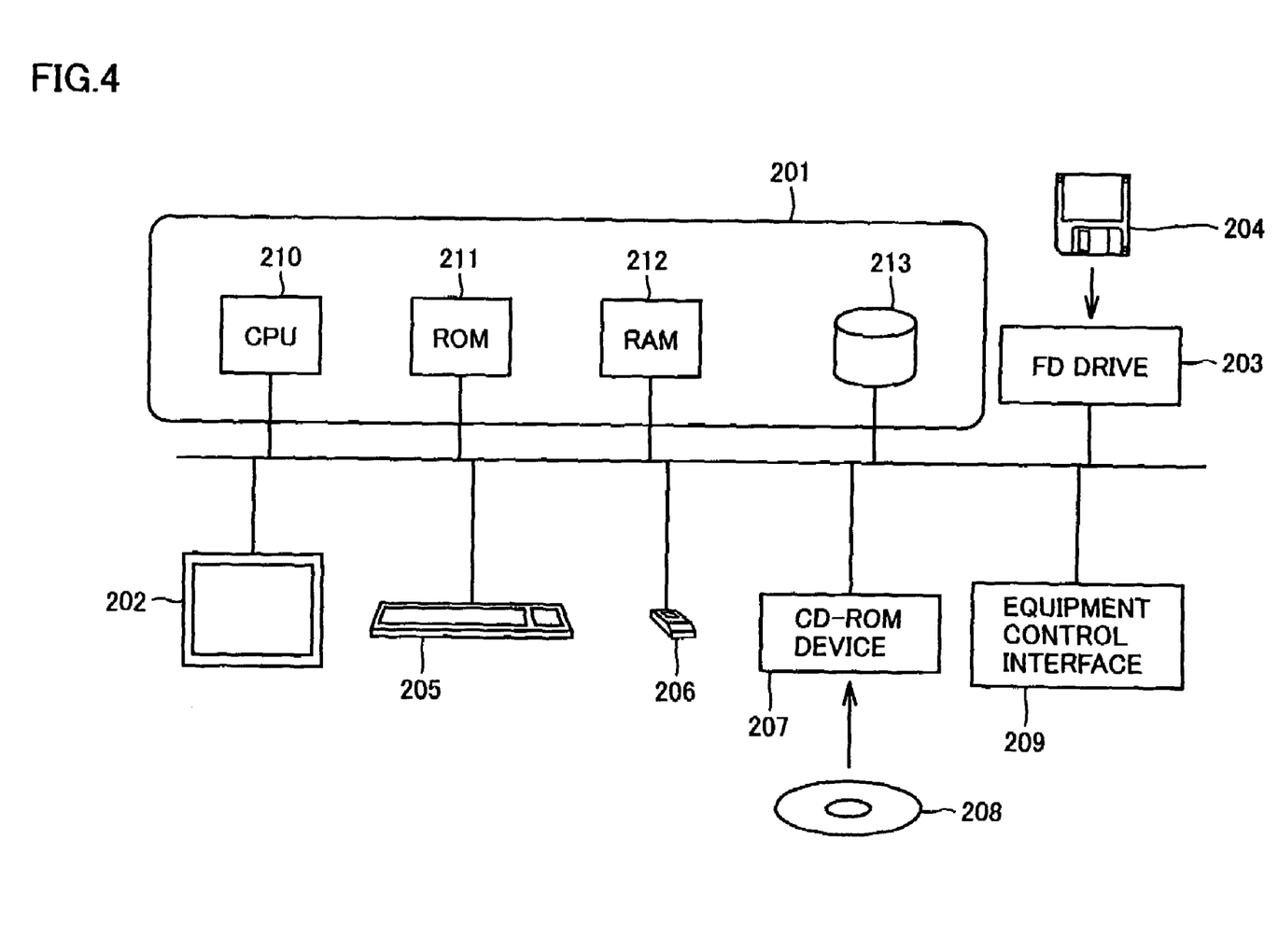
FIG. 4 is a block diagram showing an exemplary configuration of a computer inspecting the semiconductor manufacturing apparatus according to the first embodiment of the present invention.

FIG. 4 is a block diagram showing an exemplary configuration of a computer inspecting the semiconductor manufacturing apparatus according to the first embodiment of the present invention. The computer includes a computer body 201, a display device 202, an FD (Flexible Disk) drive 203 loaded with an FD 204, a keyboard 205, a mouse 206, a CD-ROM (Compact Disc-Read Only Memory) device 207 loaded with a CD-ROM 208, and an equipment control interface 209.

A program for inspecting the semiconductor manufacturing apparatus (hereinafter referred to as an inspection program) is supplied by a record medium such as FD 204 or CD-ROM 208. The execution of the inspection program by computer body 201 achieves the inspection of the semiconductor manufacturing apparatus.

Computer body 201 includes CPU (Central Processing Unit) 210, ROM (Read Only Memory) 211, RAM (Random Access Memory) 212, and a hard disk 213. CPU 210 inputs/outputs data between display device 202, FD drive 203, keyboard 205, mouse 206, CD-ROM device 207, equipment control interface 209, ROM 211, RAM 212 or hard disk 213 for processing. The inspection program recorded in FD 204 or CD-ROM 208 is stored in hard disk 213 via FD drive 203 or CD-ROM device 207 by CPU 210. CPU 210 loads the inspection program as appropriate from hard disk 213 into RAM 212 and executes to achieve inspection of the semiconductor manufacturing apparatus.

Figure 5:
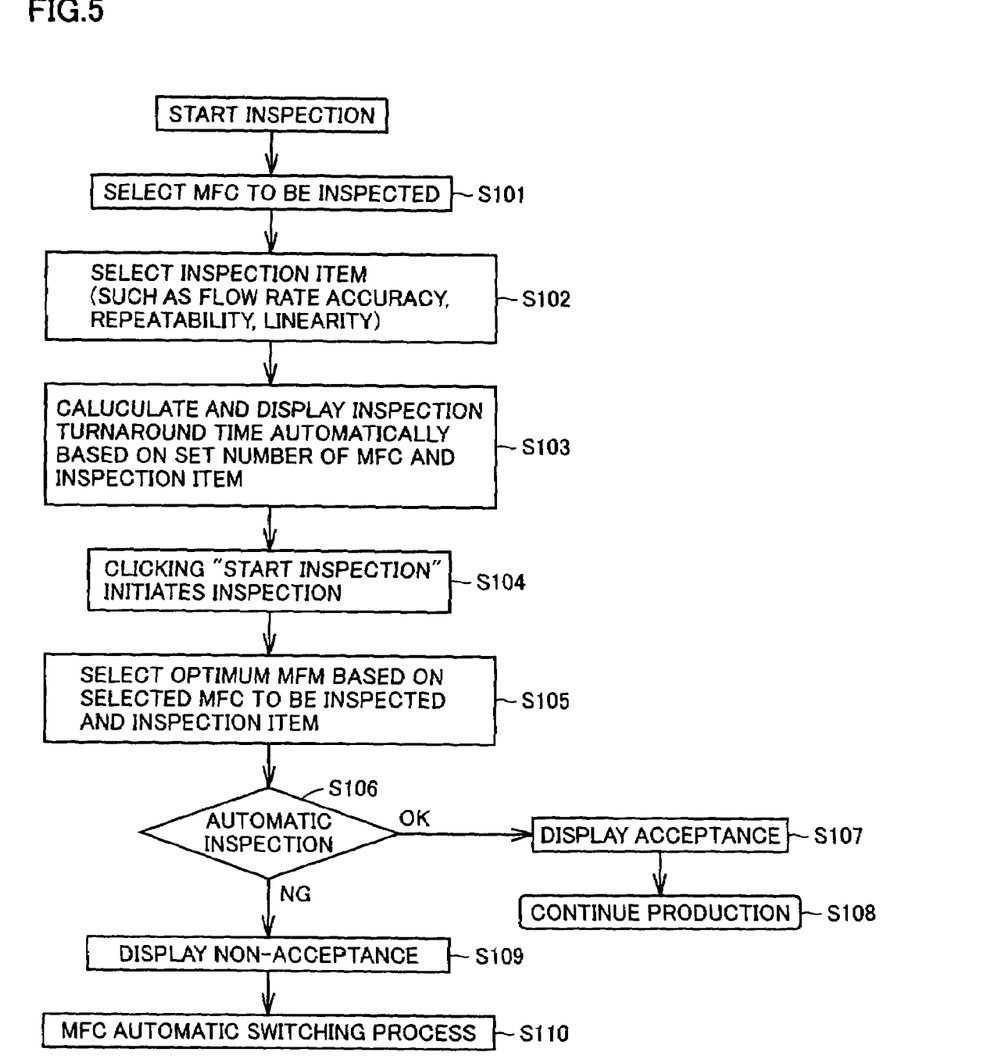
FIG. 5 is a flowchart indicating the processing procedure of the computer during inspection of the semiconductor manufacturing apparatus according to the first embodiment of the present invention.

FIG. 5 is a flowchart indicating the processing procedure of the computer during inspection of the semiconductor manufacturing apparatus according to the first embodiment of the present invention. First, the computer displays a frame for selecting MFC to be inspected (hereinafter referred to as the MFC selecting frame) on display device 202 for an operator to select MFC to be inspected (S101).

Figure 6:
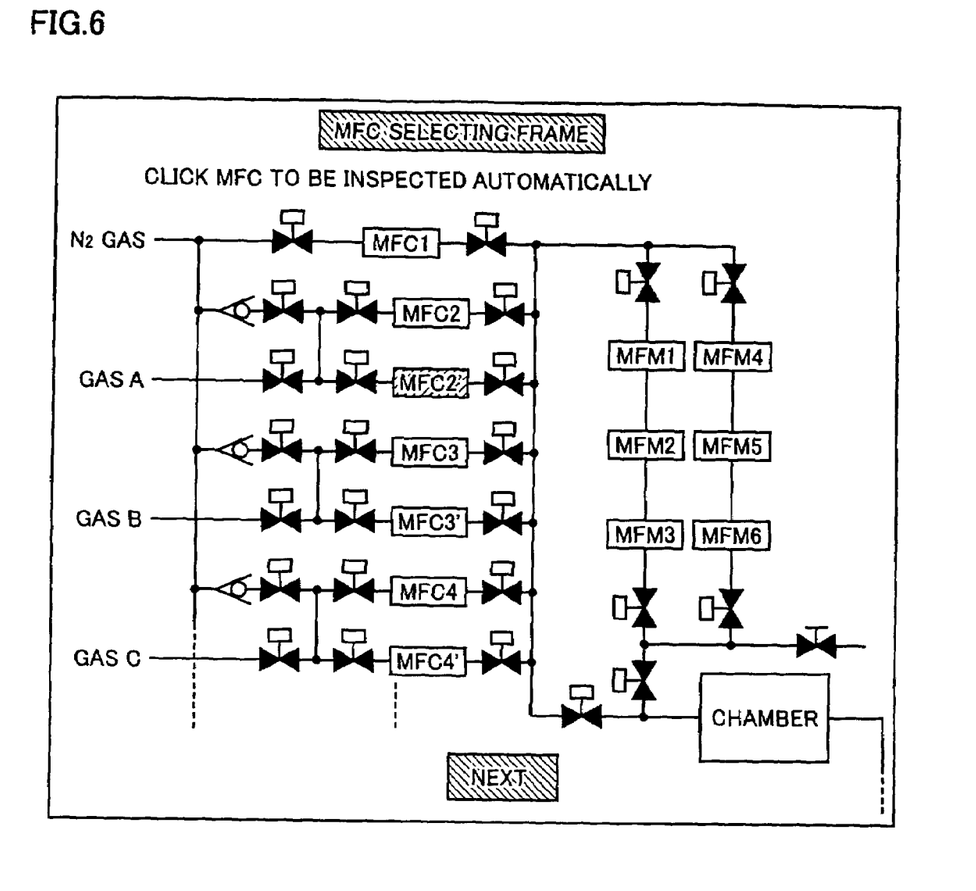
FIG. 6 shows one example of MFC selecting frame.

FIG. 6 shows one example of the MFC selecting frame. The MFC selecting frame indicates overall configuration of the semiconductor manufacturing apparatus, and the indication of MFC selected by the operator (clicked with mouse 206) is shown in reverse video. FIG. 6 illustrates the state when the operator selected MFC 2' (102'). A plurality of MFC can be selected for inspection.

Next, the computer displays a frame for setting an inspection item for selected MFC (hereinafter referred to as the inspection item setting frame) on display device 202 for the operator to set the inspection item (S102).

Figure 7:
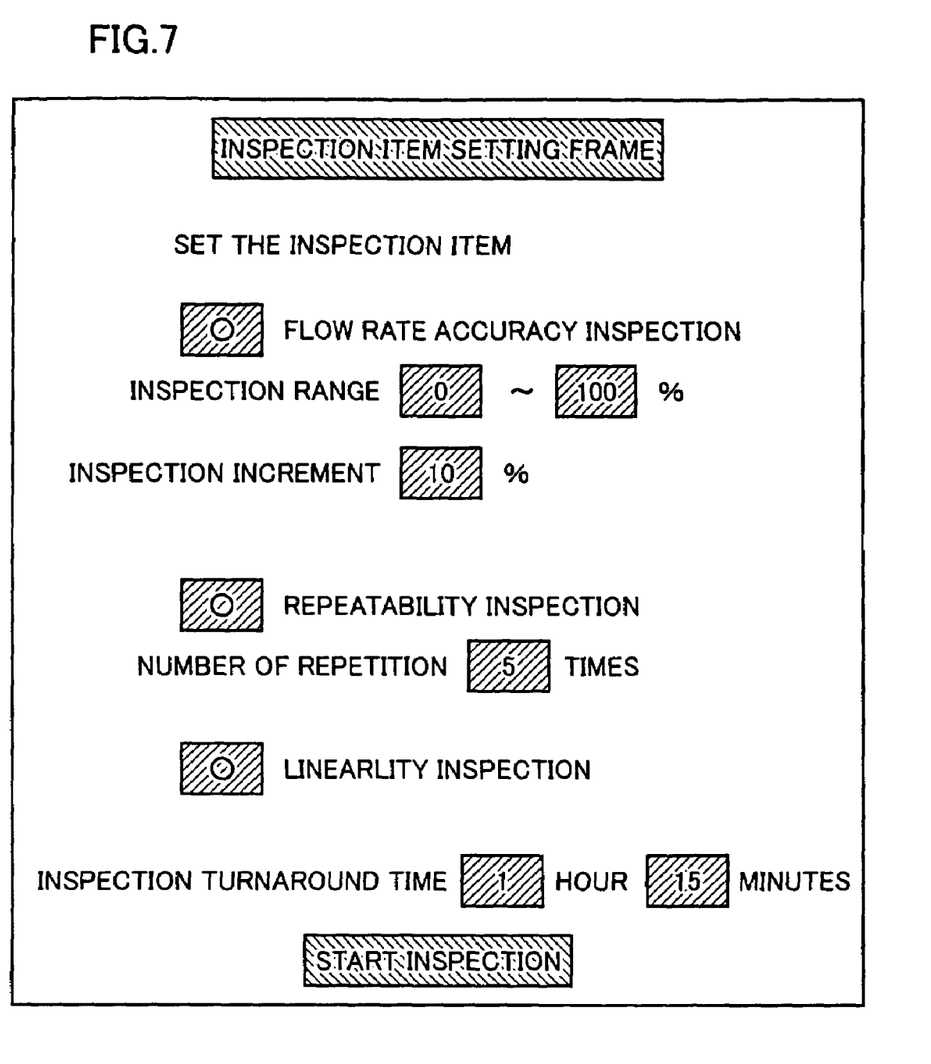
FIG. 7 shows one example of inspection item setting frame.

FIG. 7 shows one example of the inspection item setting frame. The inspection item setting frame indicates a flow rate accuracy inspection, a repeatability inspection, and a linearity inspection as inspection items. The operator can select a plurality of inspection items among the inspection items indicated on the inspection item setting frame.

When the flow rate accuracy inspection is selected, the inspection range (%) for the flow rate range of MFC, as well as the increment of the inspection range hereinafter referred to as inspection increment) (%) are set. In FIG. 7, the inspection range is set as 0–100%, and the inspection increment is set as 10%.

When the repeatability inspection is selected, the number of repetition is set. In FIG. 7, the number of repetition is set to five. As for the linearity inspection, no item is required to be set by the operator.

Next, the computer refers to the numbers of MFC and the inspection items that are set with the MFC selecting frame and the inspection item setting frame, respectively, and then calculates the time required for the inspection and displays it as the inspection turnaround time on the inspection item setting frame in FIG. 7 (S103). In FIG. 7, the inspection turnaround time is indicated as 1 hour and 15 minutes.

After the operator checks each item shown in the inspection item setting frame and clicks the indication of "start inspection" on the inspection item setting frame using mouse 206, the inspection of the semiconductor manufacturing apparatus is initiated based on the inspection items set (S104).

The computer selects the optimum MFM for the inspection based on the MFC and the inspection item selected by the operator (S105). Then the computer inspects the selected MFC for the inspection item that has been set (S106). If the inspected MFC is acceptable (S106, OK), the computer displays a message indicating that the MFC is acceptable on a frame for indicating the inspection result (hereinafter referred to as the inspection result indicating frame) (S107), and the production of the semiconductor device is continued by the semiconductor manufacturing apparatus (S108).

If the inspected MFC is not acceptable (S106, NG), the computer displays a message indicating that the inspected MFC is not acceptable on the inspection result indicating frame (S109), and performs an MFC automatic switching process (S110).

Figure 8:
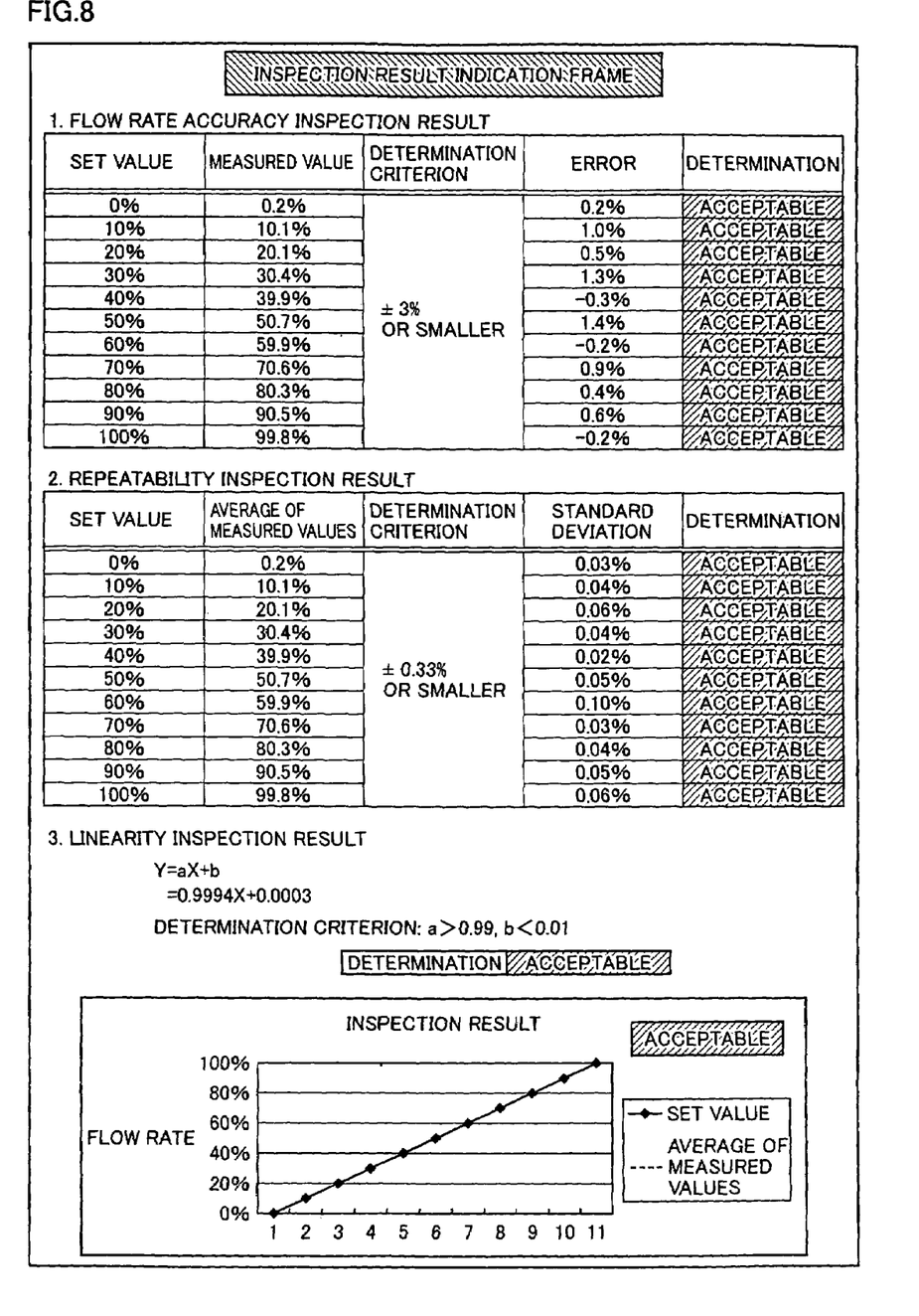
FIG. 8 shows one example of inspection result indicating frame.

FIG. 8 shows one example of the inspection result indicating frame. In the flow rate accuracy inspection result in the inspection result indicating frame, set values of MFC, measured values by MFM, determination criterion, error, and determination result are indicated. Since the inspection range of the flow rate accuracy inspection has been set as 0–100% with inspection increment set as 10% in the inspection item setting frame in FIG. 7, each set value for MFC will appear as 0%, 10%, 20%, . . . , 100%, and the flow rate measured by MFM for each set value of MFC will be shown as the measured value. In the flow rate accuracy inspection result shown herein, since each error in the measured value relative to the set value is ±3% or smaller, which is the determination criterion, the determination is shown as acceptable.

In the repeatability inspection result, MFC setting value, average of measured values by MFM, determination criterion, standard deviation, and determination result are indicated. Since the number of repetition for the repeatability inspection has been set as five in the inspection item setting frame in FIG. 7, five times of repetition is set for each set value of MFC, i.e., each flow rate of 0%, 10%, 20%, . . . , 100%. Then, the flow rates measured by MFM for five times on that set value basis are averaged and will be shown as the measurement average, for which the standard deviation is calculated and shown as well. In the repeatability inspection result shown herein, since each standard deviation relative to the set value is ±0.33% or smaller, which is the determination criterion, the determination is shown as acceptable.

In the linearity inspection result, a linear equation calculated with the least-squares method using the set value (X) of MFC and measured value by MFM (Y) is indicated. If the calculated coefficient a is larger than 0.99 and coefficient b is smaller than 0.01, then the determination will be shown as acceptable. In FIG. 8, since a=0.9994 and b=0.0003, the determination of the linearity inspection is shown as acceptable. The relationship between the set value of MFC and the measured value by MFM is also indicated in a graph.

Figure 9:
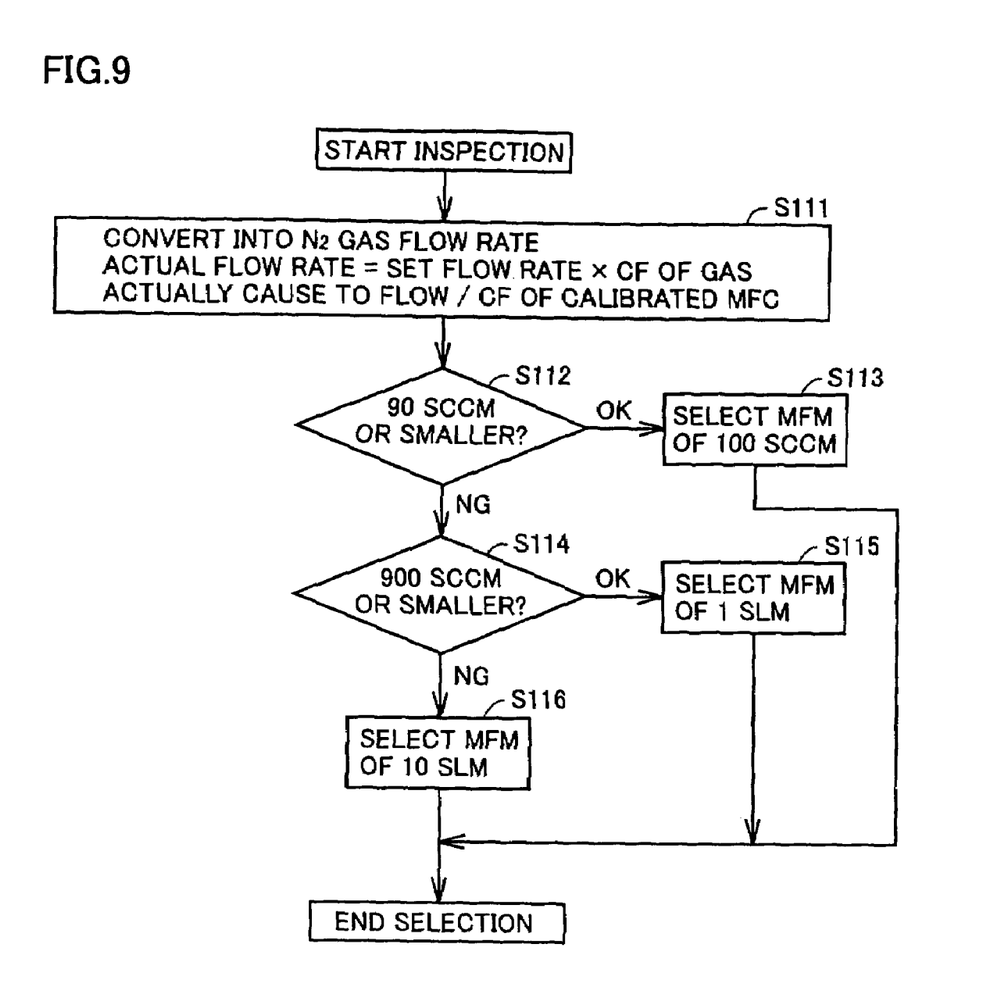
FIG. 9 is a flowchart indicating the process at step S105 in FIG. 5 in further detail.

FIG. 9 is a flowchart indicating the process at step S105 in FIG. 5 in further detail. First, the computer calculates the actual flow rate by MFC (S111). The actual flow rate by MFC is calculated as follows: (set flow rate of MFC)×(CF (Conversion Factor) of the gas actually caused to flow)/(CF of calibrated MFC).

An exemplary case will be described below, where an optimum MFM is selected among three MFMs with 100 SCCM (standard cc/min), 1SLM (standard liter/min), and 10SLM of full scale, respectively, when 500 SCCM of $N_2$ gas is caused to flow through MFC for $SiH_4$ gas (full scale: 1SLM). If the CF of the gas actually caused to flow is 1 and the CF of calibrated MFC is 0.596, then the actual flow rate of $N_2$ gas will be 500×1/0.596=838.9 SCCM.

Next, the computer determines if the actual flow rate of the gas is 90 SCCM or smaller (S112). If the actual flow rate of the gas is 90 SCCM or smaller (S112, OK), then an MFM of 100 SCCM is selected (S113). If the actual flow rate of the gas is larger than 90 SCCM (S112, NG), then the computer determines if the actual flow rate of the gas is 900 SCCM or smaller (S114).

If the actual flow rate of the gas is 900 SCCM or smaller (S114, OK), then the MFM of 1 SLM is selected (S115). If the actual flow rate of the gas is larger than 900 SCCM (S114, NG), then the MFM of 10 SLM is selected (S116). As for the MFC for $SiH_4$ gas above, the MFM of 1SLM will be selected.

Figure 10:
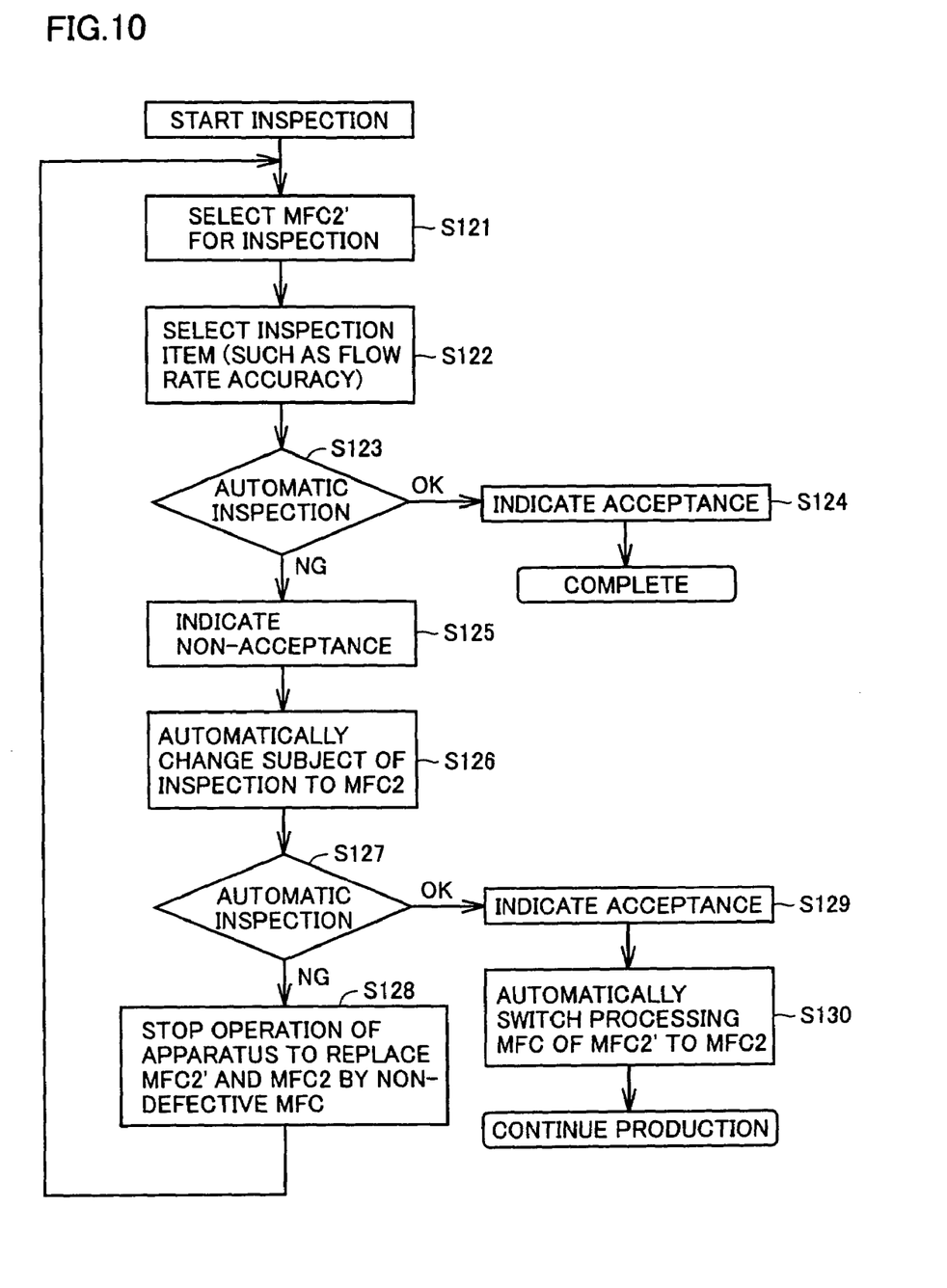
FIG. 10 is a flowchart indicating detail of step S110 (MFC automatic switching process) in FIG. 5.

FIG. 10 is a flowchart indicating detail of step S110 (MFC automatic switching process) in FIG. 5. First, the computer selects any one of operating MFC for inspection (S121). Here, description will be given assuming that MFC 2' (102') is selected for inspection.

Next, the operator selects the inspection item for MFC 2' (102') to be inspected (S122). A frame similar to the inspection item setting frame in FIG. 7 will appear for the operator to set the inspection item.

Next, the computer executes the inspection of the inspection item set by the operator for MFC 2' (102') and determines if the inspection result is acceptable (S123). If the inspection result of MFC 2' (102') is acceptable (S123, OK), then a frame indicating that the inspection is acceptable will appear on display device 202 and the process ends (S124). Here, a frame similar to the inspection result indicating frame in FIG. 8 will appear to notify the operator of the acceptance.

If the inspection result is not acceptable (S123, NG), then a frame indicating that the inspection is not acceptable will appear on display device 202 (S125). Then, the computer controls the valves to be open/closed as appropriate to change the subject of the inspection from MFC 2' (102') to MFC 2 (102) (S126).

Next, the computer executes the inspection of MFC 2 (102) and determines if the inspection result is acceptable (S127). If the inspection result of MFC 2 (102) is acceptable (S127, OK), then a frame indicating that the inspection is acceptable will appear on display device 202 (S129), and the computer switches the processing MFC to MFC 2 (102) to continue the production of the semiconductor device by the semiconductor manufacturing apparatus.

If the inspection result is not acceptable (S127, NG), then the computer stops the operation of the semiconductor manufacturing apparatus for the operator to replace MFC 2' (102') and MFC 2 (102) by non-defective MFC, respectively. Then, the process goes back to step 121 and the same processing is repeated.

As described above, according to the semiconductor manufacturing apparatus according to the present embodiment, by providing a plurality of MFC of the same type for each gas, when an anomaly appears in one MFC, it can be switched to another MFC by opening/closing the valves. Thus, the operation of the semiconductor manufacturing apparatus can be continued without works such as an MFC replacement or a process check.

Further, by providing a plurality of MFM in the semiconductor manufacturing apparatus for passing gas from the MFC therethrough by opening/closing the valves, MFC can be inspected while maintaining the connection to the semiconductor manufacturing apparatus such as the chamber or the CVD.

Still further, by providing MFM checking ports for connecting to external inspection equipment, the accuracy of MFM in the semiconductor manufacturing apparatus can be checked easily.

Second Embodiment

Figure 11:
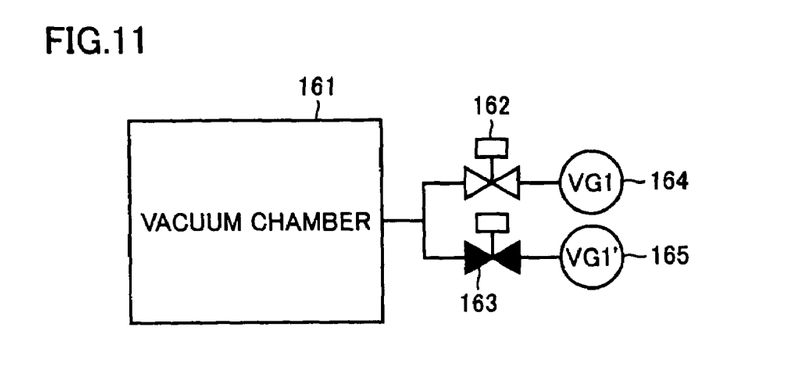
FIG. 11 is a block diagram schematically showing a configuration of a semiconductor manufacturing apparatus according to a second embodiment of the present invention.

FIG. 11 is a block diagram schematically showing a configuration of a semiconductor manufacturing apparatus according to a second embodiment of the present invention. The semiconductor manufacturing apparatus includes a vacuum chamber 161, valves 162 and 163, and vacuum gages VG1 (164) and VG1' (165). Each of the components of the semiconductor manufacturing apparatus can be controlled by the computer shown in FIG. 4. In the present embodiment, though the description will be made for vacuum gages, it can be applied to various sensors.

In FIG. 11, valve 162 is open while valve 163 is closed, and the degree of vacuum in vacuum chamber 161 is measured by VG1 (164). If valve 162 is closed while valve 163 is open, then the degree of vacuum in vacuum chamber 161 is measured by VG1' (165).

Figure 12:
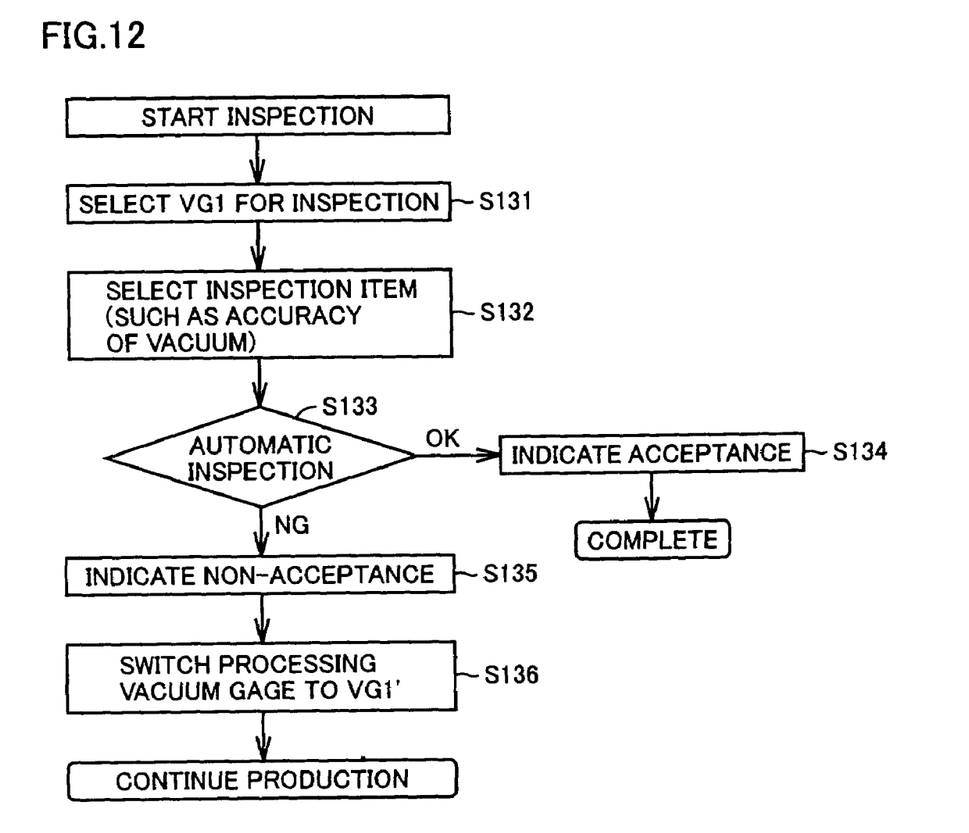
FIG. 12 is a flowchart indicating processing procedure of the semiconductor manufacturing apparatus according to the second embodiment of the present invention.

FIG. 12 is a flowchart indicating processing procedure of the semiconductor manufacturing apparatus according to the second embodiment of the present invention. First, the computer selects any one of operating vacuum gage for inspection (S131). Here, description will be given assuming that VG1 (164) is selected for inspection.

Next, the operator selects the inspection item (e.g., accuracy of vacuum) for VG1 (164) to be inspected (S132). Here, a frame similar to the inspection item setting frame in FIG. 7 will appear for the operator to set the inspection item.

Next, the computer executes the inspection of VG1 (164) for the inspection item set by the operator and determines if the inspection result is acceptable (S133). If the inspection result of VG1 (164) is acceptable (S133, OK), then a frame indicating that the inspection is acceptable will appear on display device 202 and the process ends (S134). Here, a frame similar to the inspection result indicating frame in FIG. 8 will appear to notify the operator of the acceptance.

If the inspection result is not acceptable (S133, NG), then a frame indicating that the inspection is not acceptable will appear on display device 202 (S135). Then, the computer controls the valves to be open/closed as appropriate to change the subject of the inspection from VG1 (164) to VG1' (165) (S136), and the production of the semiconductor device by the semiconductor manufacturing apparatus is continued.

As described above, according to the semiconductor manufacturing apparatus according to the present embodiment, by providing a plurality of vacuum gages of the same type, when an anomaly appears in an operating vacuum gage, it can be switched to another vacuum gage by opening/closing the valves. Thus, the operation of the semiconductor manufacturing apparatus can be continued without works such as a vacuum gage replacement.

Third Embodiment

Figure 13:
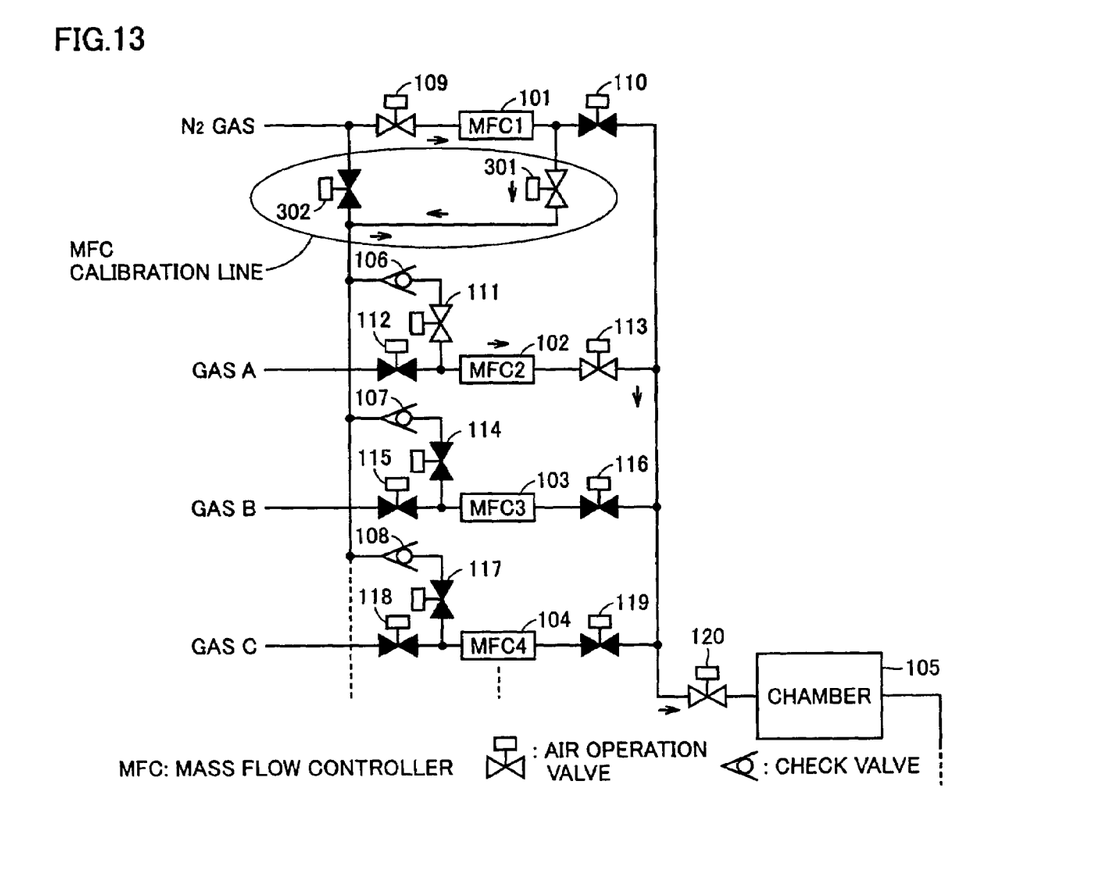
FIG. 13 is a block diagram schematically showing a configuration of a semiconductor manufacturing apparatus according to a third embodiment of the present invention.

FIG. 13 is a block diagram schematically showing a configuration of a semiconductor manufacturing apparatus according to a third embodiment of the present invention. It is different from the schematic configuration of the semiconductor manufacturing apparatus shown in FIG. 1 in that a valve 301 is provided between MFC (101) and valve 110, and further a valve 302 is provided to form a bypass line (calibration line).

In FIG. 13, MFC 1 (101) is designated as MFC for inspection, and the gas flow when inspecting MFC 2 (102) is indicated. Specifically, valves 109, 111, 113, 120 and 301 are open, and the rest of the valves are closed. Thus, by comparing the flow rate of N$_2$ gas set for MFC 1 (101) and the flow rate measured by MFC 2 (102), calibration of MFC 2 (102) may be achieved. It is assumed that the flow rate of MFC 1 (101) is correctly controlled.

Further, calibration of MFC 3 (103) may be achieved by closing valves 111 and 113 and opening valves 114 and 116. Similarly, calibration of MFC4 (104) may be achieved by closing valves 111 and 113 and opening valves 117 and 119. Controlling of opening/closing of the valves and MFC is performed by a computer or the like shown in FIG. 4, similarly to the first embodiment.

Figure 14A:
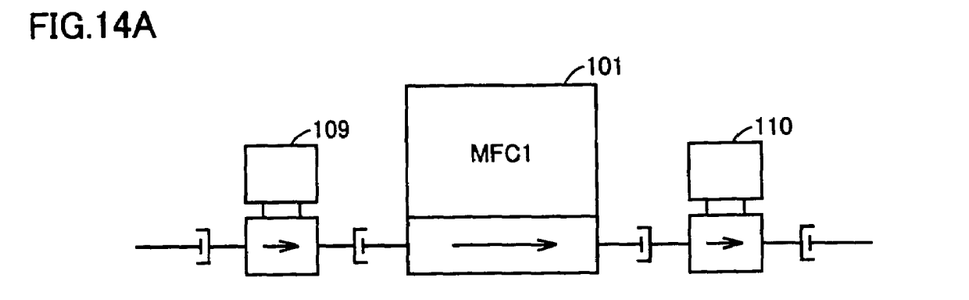
FIGS. 14A and 14B show one example of modifying an existing semiconductor manufacturing apparatus to provide a bypass line shown in FIG. 13.
Figure 14B:
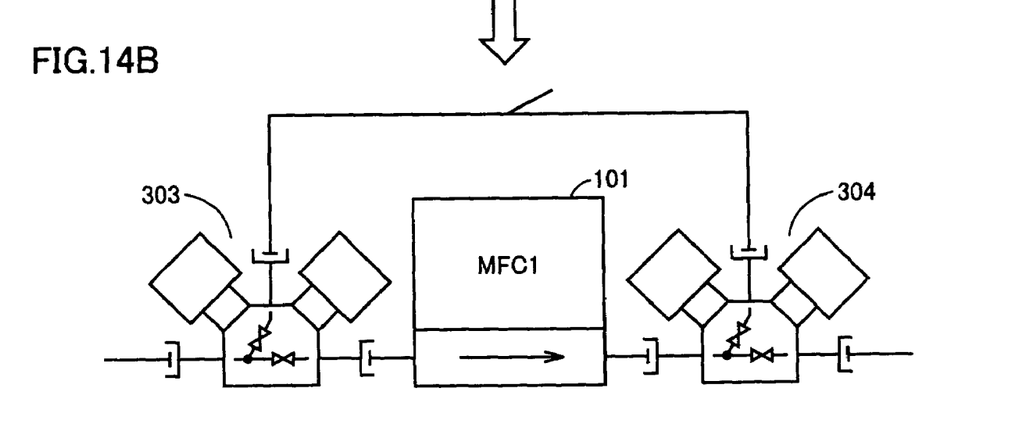

FIGS. 14A and 14B show one example of modifying an existing semiconductor manufacturing apparatus to provide a bypass line shown in FIG. 13. FIG. 14A shows MFC 1 (101) of the existing semiconductor manufacturing apparatus shown in FIG. 1 and valves 109 and 110 at upstream and downstream thereof. As shown in FIG. 14B, a bypass line can be added only by replacing valves 109 and 110 by block valves 303 and 304, without largely changing the layout of the piping. A piping connected to check valves 106, 107 and 108 is connected to the bypass line between block valves 303 and 304.

As above, according to the semiconductor manufacturing apparatus of the present embodiment, since valves 301 and 302 are added to provide the bypass line, designating MFC 1 (101) as MFC for inspection and calibration of other MFC 2–4 (102–104) are performed, the inspection of MFC can be achieved while maintaining the connection to a semiconductor manufacturing apparatus such as a chamber or a CVD.

Further, since the bypass line can be provided only by replacing an existing valve by the block valve, modification of an existing semiconductor manufacturing apparatus into a semiconductor manufacturing apparatus capable of inspection is enabled.

Fourth Embodiment

Figure 15:
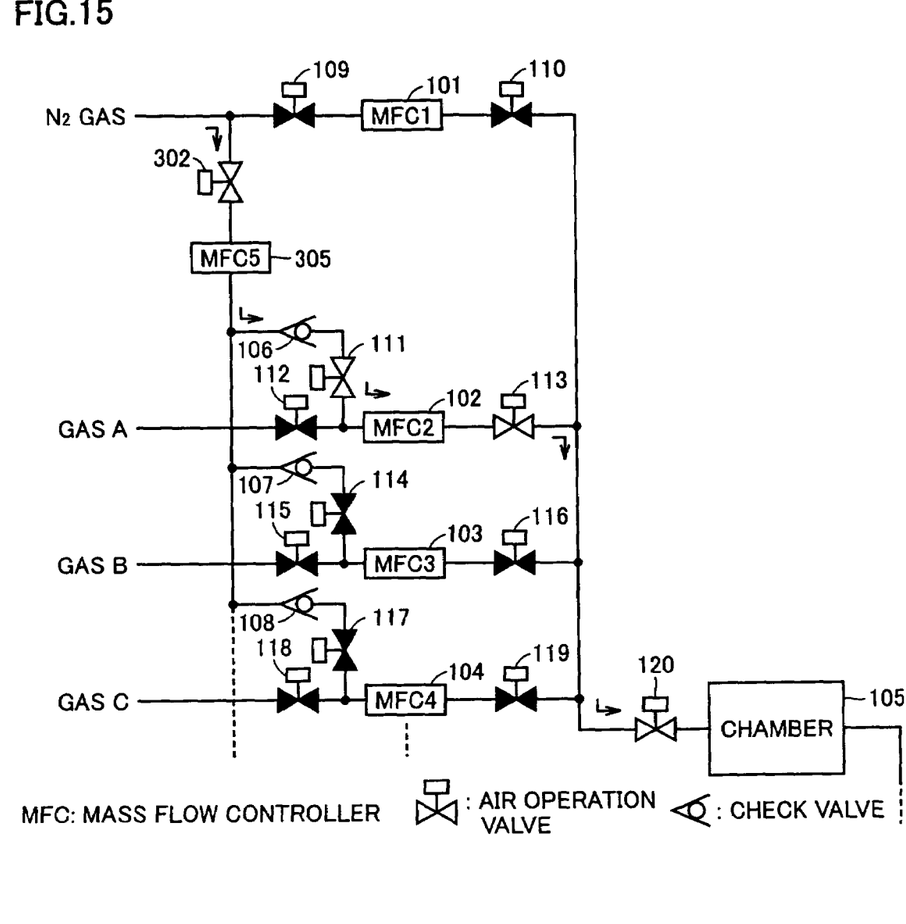
FIG. 15 is a block diagram schematically showing a configuration of a semiconductor manufacturing apparatus according to a fourth embodiment of the present invention.

FIG. 15 is a block diagram schematically showing a configuration of a semiconductor manufacturing apparatus according to a fourth embodiment of the present invention. It is different from the schematic configuration of the semiconductor manufacturing apparatus shown in FIG. 1 in that a valve 302 and an MFC 5 (305) are added to form a calibration line.

In FIG. 15, MFC 5 (305) is designated as MFC for inspection, and the gas flow when inspecting MFC 2 (102) is indicated. Specifically, valves 111, 113, 120 and 302 are open, and the rest of the valves are closed. Thus, by comparing the flow rate of $N_2$ gas set for MFC 5 (305) and the flow rate measured by MFC 2 (102), calibration of MFC 2 (102) may be achieved. It is assumed that the flow rate of MFC 5 (305) is correctly controlled.

Further, calibration of MFC 3 (103) may be achieved by closing valves 111 and 113, and opening valves 114 and 116. Similarly, calibration of MFC4 (104) may be achieved by closing valves 111 and 113, and opening valves 117 and 119. Controlling of opening/closing of the valves and MFC is performed by a computer or the like shown in FIG. 4, similarly to the first embodiment.

As above, according to the semiconductor manufacturing apparatus of the present embodiment, since valve 302 and MFC 5 (305) are added to form the calibration line, MFC 5 (305) is designated as MFC for inspection and calibration of MFC 2–4 are performed, the inspection of MFC can be achieved while maintaining the connection to a semiconductor manufacturing apparatus such as a chamber or a CVD.

Further, since a gas does not flow into MFC 5 (305) in a normal operation other than purging or calibration, the reliability of MFC (MFC 5) for inspection may be improved as compared to the third embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor manufacturing apparatus using a plurality of gases for processing, comprising:
    a chamber into which said plurality of gases flow;
    a plurality of mass flow controllers provided corresponding to said plurality of gases;
    a plurality of mass flowmeters, a mass flowmeter measuring each flow rate of said plurality of gases;
    a plurality of valves controlling each flow of said plurality of gases; and
    a control unit controlling opening/closing of said plurality of valves such that said plurality of gases flow into said chamber directly during an operation of said semiconductor manufacturing apparatus, and controlling opening/closing of said plurality of valves such that anyone of said plurality of gases flows into said mass flowmeter when inspecting said mass flow controller, wherein
    said control unit selects a mass flowmeter having an optimum flow rate range among said plurality of mass flowmeters in accordance with a flow rate range of a mass flow controller to be inspected.

2. The semiconductor manufacturing apparatus according to claim 1, wherein
    said control unit calculates an actual flow rate of a gas based on a flow rate set for said mass flow controller to be inspected and a conversion factor, and selects a mass flowmeter having an optimum flow rate range among said plurality of mass flowmeters.

3. The semiconductor manufacturing apparatus according to claim 1, wherein
    said control unit selects any mass flow controller for inspection from said plurality of mass flow controllers in accordance with an instruction, from an operator.

4. The semiconductor manufacturing apparatus according to claim 3, wherein
    said control unit inspects said mass flow controller selected for inspection based on an inspection range of said mass flow controller and an increment of said inspection range set by the operator.

5. The semiconductor manufacturing apparatus according to claim 4, wherein
    said control unit sets any value up to full scale for said mass flow controller as the inspection range of said mass flow controller.

6. The semiconductor manufacturing apparatus according to claim 1, wherein
    said control unit determines if a mass flow controller under inspection is acceptable based on a predetermined reference value, and
    said semiconductor manufacturing apparatus further comprising a display unit displaying a result of said determination of said control unit.

7. The semiconductor manufacturing apparatus according to claim 1, further comprising
    a second mass flow controller provided in parallel to a first mass flow controller among said plurality of mass flow controllers, wherein
    said first and second mass flow controllers are of a same type, and
    said control unit controls opening/closing of said plurality of valves so that said second mass flow controller operates when an anomaly is detected in said first mass flow controller.

8. A semiconductor manufacturing apparatus using a plurality of gases for processing, comprising:
    a chamber into which said plurality of gases flow;
    a plurality of mass flow controllers provided corresponding to said plurality of gases;
    a mass flowmeter measuring each flow rate of said plurality of gases;
    a plurality of valves controlling each flow of said plurality of gases;
    a control unit controlling opening/closing of said plurality of valves such that said plurality of gases flow into said chamber directly during an operation of said semiconductor manufacturing apparatus, and controlling opening/closing of said plurality of valves such that anyone of said plurality of gases flows into said mass flowmeter when inspecting said mass flow controller; and
    an external port to which external inspection equipment is connected, wherein
    said control unit controls opening/closing of said plurality of valves so that anyone of said plurality of gases flows into said external inspection equipment via said mass flowmeter and said external port.

* * * * *